United States Patent [19]
Leonhardt, Jr. et al.
[11] 3,711,926
[45] Jan. 23, 1973

[54] DIGITAL RACK WIRING STATION

[75] Inventors: Joseph H. Leonhardt, Jr.; Jack I. Lunsford, Jr.; Bynum B. Sharpe; Charles T. Templin, all of Burlington, N.C.

[73] Assignee: Western Electric Company, Incorporated, New York, N.Y.

[22] Filed: Oct. 1, 1971

[21] Appl. No.: 185,579

[52] U.S. Cl. ....................29/203 B
[51] Int. Cl. ....................H01r 43/00
[58] Field of Search...29/203 B, 203 D, 203 P, 203 R

[56] References Cited

UNITED STATES PATENTS 3,651,566 3/1972 Kincaid et al. ....................29/203 B X

*Primary Examiner*—Thomas H. Eager
*Attorney*—W. M. Kain et al.

[57] ABSTRACT

A digital rack wiring station has facilities for visually displaying individual wiring steps of a series of wiring steps in a predetermined sequence and facilities for moving individual wires of a group of wires into a preselected position in accordance with the particular wiring step displayed. A rotatably mounted receptacle having a plurality of slots formed in the wall supports the plurality of wires therein and an end of each wire in one of the slots. A plate having a series of coded references in the form of binary numbers supports the receptacle and is aligned therewith such that each of the binary numbers corresponds to one of the slots. As the plate is incrementally rotated through a gear arrangement, the coded references are moved over a number of sensing elements which sequentially reads and forwards the binary number to a Data Register and Control Unit. The Data Register and Control Unit individually compares each binary number of the sensing elements with a stored binary number. The stored binary number corresponds to a particular slot holding the wire called for in the displayed wiring step. If a difference is found to exist between the binary number read by the sensing elements and the stored binary number, the Data Register and Control Unit continues to energize facilities to incrementally rotate the plate and the receptacle until there is no difference between the binary numbers. At this time, the particular wire called for in the wiring step is in the preselected position.

10 Claims, 4 Drawing Figures

INVENTORS
J. H. LEONHARDT JR.
J. I. LUNSFORD JR.
B. B. SHARPE
C. T. TEMPLIN

By W L Williamson
ATTORNEY

DIGITAL RACK WIRING STATION

BACKGROUND OF THE INVENTION

1. Field of the Invention

This invention relates to a digital rack wiring station, and more particularly, to an apparatus for presenting individual ones of a plurality of articles of indefinite length in a desired sequence to a preselected article removal position.

2. Description of the Technical Problems

In telephone switching systems and in radar systems, it is common practice to use digital racks to conserve space and facilitate maintenance of the systems, e.g., replacing defective circuits. Generally, logic circuit boards having a series of circuit terminations on one end thereof are plugged into connections provided on one side of the rack. On the other side of the rack are a number of terminals, each corresponding to one of the circuit terminations. These terminals are selectively interconnected by a plurality of wires. A completely wired digital rack often times requires thousands of wires, each having various lengths and thicknesses to connect particular terminals.

The prior art of wiring a digital rack provides that a wiring plan be formulated to aid an operator in properly wiring the rack. This wiring plan calls for precutting wires to a particular length, coding the wires to indicate which wire is to be connected to particular terminals and in which sequence the wires are to be used. The precut wires are then selectively placed in bins located at a wiring station. The operator then reads the wiring plan which shows which one of the wires in the several bins is to be used. After the wire is removed from the bin, the operator once again checks the wiring plan for instructions as to which terminals are to be connected by the wire. The terminals are then connected. The above steps are repeated, each time using a different wire to connect a different pair of terminals, until the rack is completely wired. To wire certain digital racks, the steps may have to be repeated several thousand times.

As can be appreciated, the prior art requires a high level of operator attention and if one error is made, the rack is inoperable. Because each step must be repeated several thousand times to completely wire a digital rack, there is a high probability of error. At the outset, the operator must read the wiring plan correctly. This means that the operator must select the proper wire in the sequence called for in the wiring plan. If the proper sequence is not followed, it would be difficult if not impossible to connect all the terminals. This is because the terminals are buried beneath thousands of wires. Even if the operator reads the wiring plan correctly, she must select the proper wire. If terminals are connected with a wire having a different resistance than that called for, the circuits will not operate properly. Further, even though the proper wire is selected, the operator must then connect the proper terminals. If the wrong terminals are connected, the wrong circuits are connected and the system will not operate.

When a rack is completely wired and a wiring error is made, it is difficult if not impossible to correct the error. The reasons are that the error must first be found and then corrected. Since there are thousands of terminals, locating the one terminal or terminals erroneously connected in a tedious and costly operation. Even if the wiring error is located, the problem of correcting the error is magnified when it is realized that the terminals are buried beneath thousands of wires.

SUMMARY OF THE INVENTION

An object of the present invention is to provide a digital rack wiring station that reduces operator error and increases operator efficiency.

It is a further object of this invention to provide facilities for automatically presenting individual articles of indefinite length in a desired sequence to a preselected article removal position.

With these and other objects in view, the invention contemplates an apparatus having a rotatably mounted receptacle for holding a plurality of articles of indefinite length and having facilities for retaining at least one end of each of the articles at a predetermined location on the receptacle. The receptacle is rotated through a preselected position when it is determined that a predetermined location is in a position other than the preselected position so as to move the predetermined location into the preselected position.

DETAILED DESCRIPTION

Figure 1:
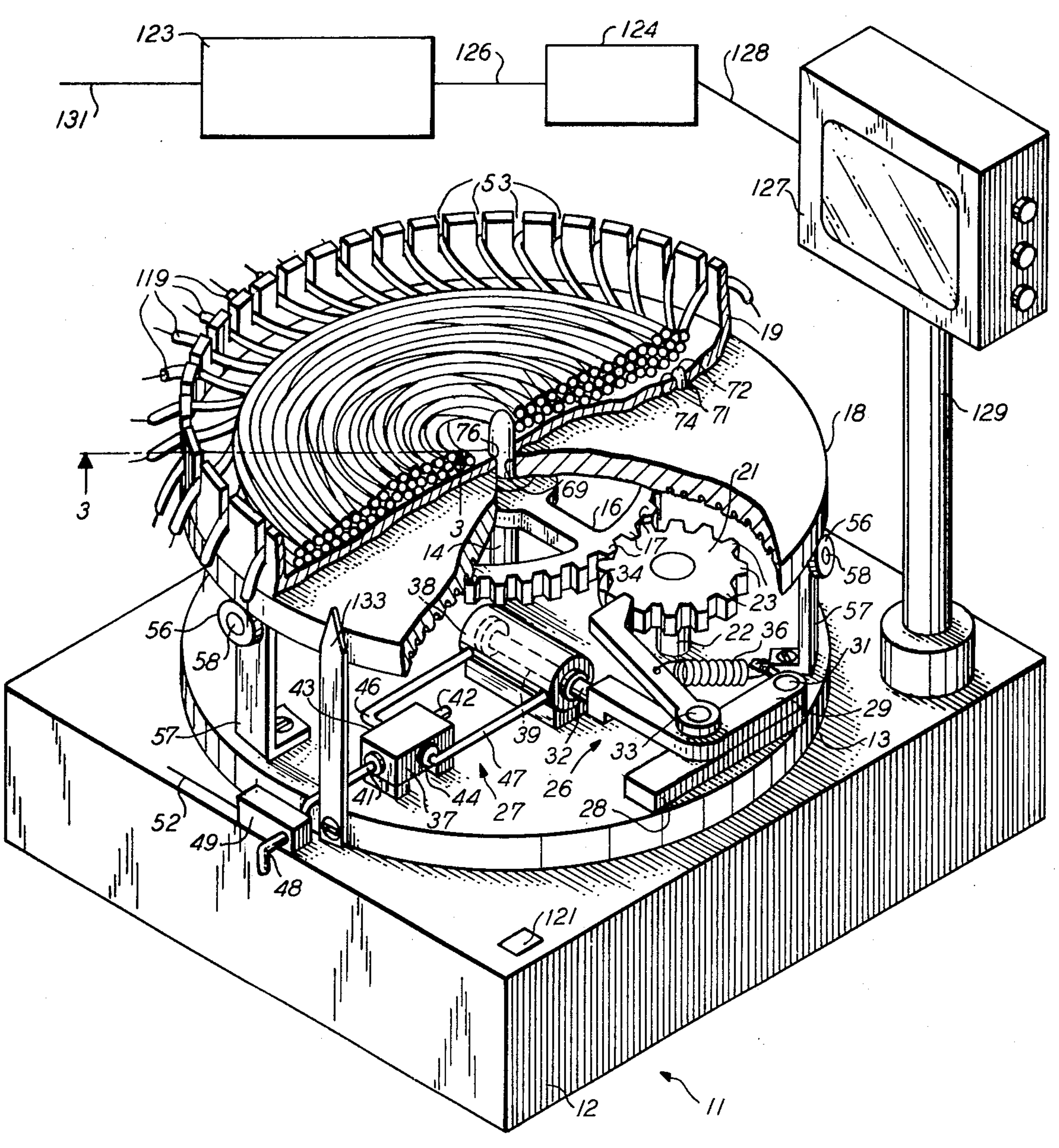
FIG. 1 is a pictorial view in perspective of a wiring station embodying the principles of the invention, which station is illustrated in a cut-away portion.

Referring now to the drawing, attention is directed to FIG. 1 which illustrates a wiring station designated generally by the numeral 11. The wiring station 11 has a base 12 on which is securely mounted a circular plate 13 having an axial shaft 14. A gear wheel 16 having gear teeth 17—17 and supporting a plate 18 and a receptacle 19 is rotatably mounted on the shaft 14, and is rotated by a rachet gear wheel 21 which is rotatably mounted on a shaft 22. The shaft 22 is securely mounted on the plate 13 a sufficient distance from the shaft 14 such that gear teeth 23—23 of the rachet gear wheel 21 mesh with the gear teeth 17—17 of the gear wheel 16. In this manner, rotation of the rachet gear wheel 21 in a clockwise direction rotates the gear wheel 16 in a counterclockwise direction as viewed in FIG. 1.

The rachet gear wheel 21 is rotated in the clockwise direction as viewed in FIG. 1 by way of a rachet assembly 26 which in turn is actuated by an air cylinder assembly 27.

The rachet assembly 26 includes a block 28 which is securely mounted on plate 13 and supports an L-shaped pawl 29. The L-shaped pawl 29 has one leg pivotally mounted to the block 28 by a pin 31 and the other leg connected to a piston shaft 32 of the air cylinder assembly 27. Pivotally mounted at the junction of the legs of the L-shaped pawl 29 by way of pin 33 is a pawl tooth 34. The pawl tooth 34 is constantly maintained against the gear teeth 23—23 of the rachet gear wheel 21 by way of compression spring 36. As the piston shaft 32 moves to the right (FIG. 1) or the forward direction, the L-shaped pawl 29 is pivoted about pin 31 in a counterclockwise direction as viewed in FIG. 1, to pivot the pawl tooth 34 out of a gear tooth 23 of the rachet gear wheel 21. The compression spring 36 urges the pawl tooth 34 against the gear teeth 23—23 pulling the pawl tooth 34 into the next gear tooth as the L-shaped pawl 29 is further pivoted about pin 31. When the piston shaft 32 of the air cylinder assembly 27 moves to the left (FIG. 1) or the reverse direction, the L-shaped pawl 29 is pivoted about the pin 31 in a clockwise direction as viewed in FIG. 1. The motion of the L-shaped pawl 29 urges the pawl tooth 34, which is held in the gear tooth 23 by the spring 36, against the gear tooth of the rachet gear wheel 21, rotating the rachet gear wheel 21 in a clockwise direction. Rotation of the rachet gear wheel 21 in a clockwise direction rotates the gear wheel 16, the plate 18 and the receptacle 19 in a counterclockwise direction as viewed in FIG. 1.

The air cylinder assembly 27, which pivots the L-shaped pawl 29 by way of the piston shaft 32, includes a four-way valve 37 and an air cylinder 38 having a piston 39 connected to the piston shaft 32. The four-way valve 37 has an inlet port 41, exit port 42 and two additional ports 43 and 44. Conduits 46 and 47 are employed to connect ports 43 and 44 to the rear end and forward end respectively of the air cylinder 38. The valve 37 either connects the port 43 to the inlet port 41 and the port 44 to the exit port 42 or it connects inlet port 41 to the port 44 and the port 43 to the exit port 42. This is accomplished by a pilot (not shown) which switches in response to air pressure within the air cylinder 38. Pressurized air is applied to the four-way valve 37 through the inlet port 41 from a source of pressurized air (not shown) through a conduit 48. A solenoid valve 49, which is spring biased in the closed position, is employed to control the flow of pressurized air to the four-way valve 37.

When pressurized air is applied to the valve 37 by the opening of the solenoid 49, the pressurized air is applied through conduit 46 to piston 39 to advance the piston and extend the piston shaft 32. Air from the air cylinder escapes from the cylinder through conduit 47 and the exit port 42. When the piston shaft 32 is fully extended pressure building up in the air cylinder 38 switches the pilot (not shown) of the four-way valve 37. This applied pressurized air to the piston 39 through conduit 47 moving the piston 39 within the air cylinder 38 causing the piston arm 32 to retract. Air now escapes from the air cylinder 38 through conduit 46 and exit port 42. When the piston is fully retracted, pressure again builds up in the air cylinder 38 to switch the pilot (not shown) of the four-way valve 37 and the process is repeated.

In this manner, as long as pressurized air is applied to the four-way valve 37, the piston 39 will continue to reciprocate thereby reciprocating the L-shaped pawl 29 and rotating the rachet gear wheel 21 to rotate the gear wheel 16, the plate 18, and the receptacle 19. The air cylinder assembly 27 described is similar to one sold by Mead Fluid Dynamics Corp. under the name Inter Pilot Air Cylinder. A Data Register and Control Unit 51 (see FIG. 3) such as Model 2539A manufactured by Hewlett Packard and to be described below, sends an electric pulse along a wire 52 to open the solenoid 49 for a sufficient interval for the piston shaft 32 to be reciprocated through one cycle thereby advancing slots 53—53 of the receptacle 19 in a stepwise fashion.

As previously mentioned, the gear wheel 16 supports the plate 18 and the receptacle 19 for rotational movement. To stabilize the plate 18 and the receptacle 19 when stationary or being rotated by the gear wheel 16, four support wheels 56—56 (two of which are shown) are provided. Each of the wheels 56—56 are advantageously mounted for rotation on L-shaped brackets 57—57 by way of pins 58—58. The L-shaped brackets 57—57 are advantageously mounted on the plate 13 such that the wheels 56—56 ride on the periphery of the plate 18.

Figure 2:
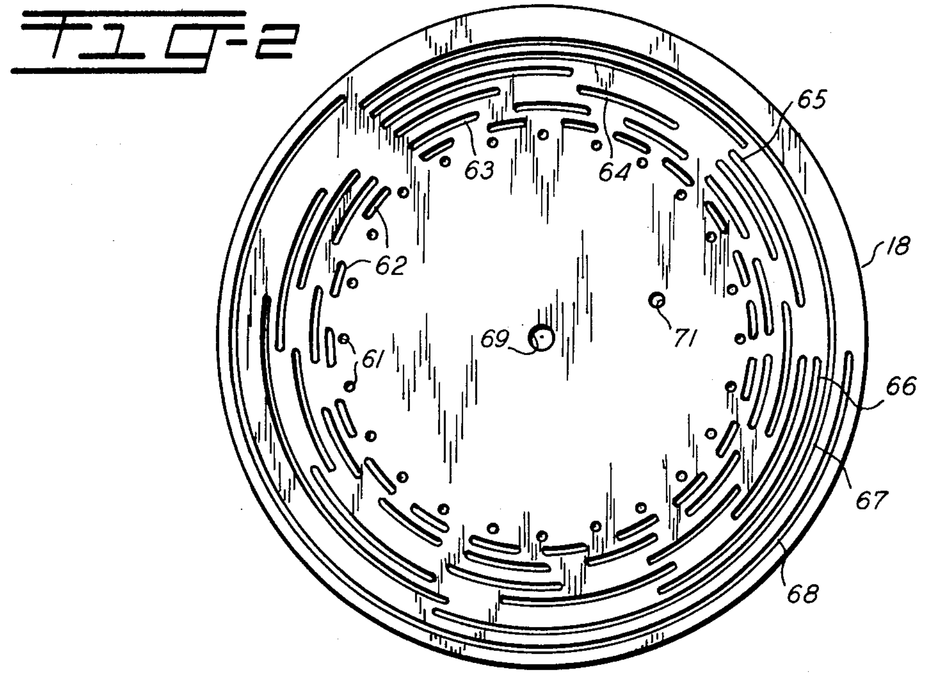
FIG. 2 is an end view of a plate showing a series of arcuate grooves of varying sizes which combine to form binary numbers each of which corresponds to one of a series of slots in a receptacle.

Attention is now directed to the plate 18, which is supported by the gear wheel 16. As shown in FIGS. 1 and 2, the plate 18 has a center hole 69 for receiving the shaft 14 and an aligning hole 71 for receiving aligning pin 72 of the gear wheel 16. Referring to FIG. 2, there is shown the bottom side of the plate 18, which side lays on the gear wheel 16 (FIG. 1). Circuate grooves 61–68 are formed on the bottom of the plate 18 and the grooves are formed about the circumference of a plurality of concentric circles which have their centers coincident with the center of center hole 69. For example, grooves 61—61 are formed about the circumference of one such concentric circle, grooves 62—62 are formed about the circumference of another such concentric circle, etc.

Figure 3:
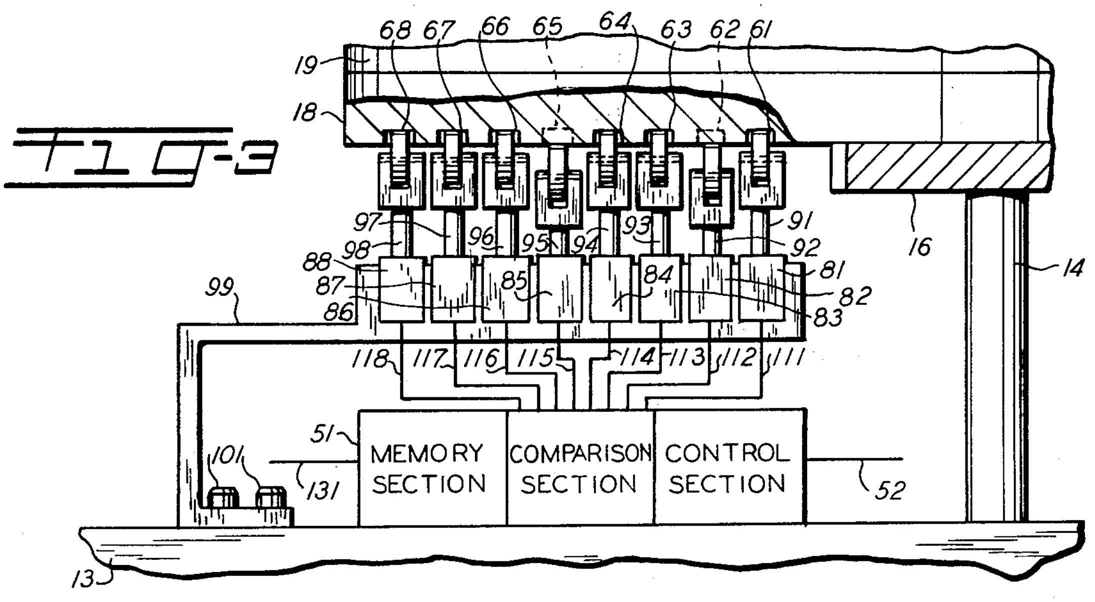
FIG. 3 is a sectional view, taken along line 3—3 of FIG. 1, showing a plurality of switches having arms that move into and out of the arcuate grooves of the plate shown in FIG. 2 as the plate rotates.

Referring now to FIG. 3, there is shown a series of microswitches 81–88 each having a wheel mounted arm 91–98, respectively. A wheel mounted arm is aligned with each of the concentric circles by advantageously mounting the microswitches 81–88 on a U-shaped member 99, which member is mounted to the plate 13 by way of screws 101—101. In this manner, the microswitches 81–88 are actuated by the grooves 61–68 as the plate 18 is rotated in a stepwise fashion by the gear wheel 16. For example, wheel mounted arm 91 is aligned with the path of groove 61, wheel mounted arm 92 with the path of groove 62, etc. By varying the length, position, and number of the grooves 61–68, it is possible to actuate the microswitches in any desired sequence for each position of the plate 18. For example, as illustrated in FIG. 3, from left to right, the first three wheel mounted arms are in the grooves, the next wheel mounted arm is not, the next two wheel mounted arms are in the groove, the next wheel mounted arm is not and the last wheel mounted arm is in a groove. As will be appreciated, the positions of the wheel mounted arms can be equated to a binary number. In other words, a wheel mounted arm in a groove can be considered a "1" and a wheel mounted arm not in a groove can be considered a "0." Accordingly, the position illustrated in FIG. 3 becomes the binary number "11101101." In this manner, each position of the plate 18 and therefore each slot 53—53 on the receptacle 19 can be identified with a unique binary number.

To maintain the desired relationship between the binary numbers formed by grooves 61–68 of plate 18 and each of the slots 53—53 of the receptacle 19, an aligning hole 74 is advantageously formed in the receptacle 19. In this manner, when center holes 69 and 76 of the plate 18 and receptacle 19 are positioned on the shaft 14 and the aligning pin 72 of the gear wheel 16 passes through the aligning hole 71 and 74 of the plate 18 and receptacle 19, respectively, each one of the binary numbers formed by the grooves 61–68 of the plate 18 is associated with a preselected slot 53 of the receptacle 19.

Referring once again to FIG. 3, as the gear wheel 16 is rotated by the rachet assembly 26 and air cylinder assembly 27 (see FIG. 1), the plate 18 is also rotated moving the grooves 61–68 over the wheel mounted arms 91–98 of the microswitches 81–88, respectively. When a groove is presented to a wheel mounted arm, its respective microswitch is in the "on" position forwarding an electric current along its respective one of wires 111–118 to a comparison section of the Data Register and Control Unit 51. The electric current changes a binary "0" in the comparison section to a binary "1." When a groove is absent, the respective wheel mounted arm rides on the bottom surface of the plate 18 and the respective microswitch is in the "off" position and there is no current sent along its respective wire. In this instance, a binary "0" in the comparison section is not changed to a binary "1". It is the combination of the "off-on" position of the microswitches 81–88 that form a binary number in the comparison section of the Data Register and Control Unit 51 that corresponds to a particular one of the slots 53—53 of the receptacle 19. In FIG. 3, the position of the microswitches 81–88 records binary number "11101101' in the comparison section. Although the grooves 61–68 are shown on the plate 18, it is to be understood that it would be within the spirit of the invention is the plate 18 was eliminated and the grooves 61–68 were formed on the bottom of the receptacle 19.

Referring once again to FIG. 1, a plurality of wires 119—119 are positioned in the receptacle 19 by inserting one end of a wire in one of the slots 53—53 and laying the remaining portion of the wires in the receptacle 19 in a circular configuration. The slot occupied by a wire is determined by a wiring plan which has been formulated for a particular rack (not shown). The end of the wire may extend beyond the wall of the receptacle 19 or may be flush therewith. A second wire having its end in another one of the slots 53—53 is layed on top of the first wire in a similar circular configuration. The steps are repeated until all of the slots 53—53 of the receptacle 19 have a wire end inserted therein and the remaining portion of the wires 119—119 are atop each other in a circular configuration. This particular configuration is termed coiled array. It has been found that laying the wires in a coiled array within the receptacle 19 allows individual removal of the wires 119—119 in any sequence without binding or bunching with the other wires.

Figure 4:
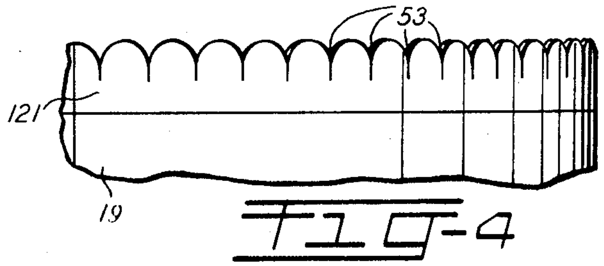
FIG. 4 is a pictorial fragmentary view of an alternate embodiment of the invention.

In the embodiment of FIG. 4, the slots 53—53 are not formed in the wall of the receptacle 19 but are formed in a rubber strip 121 which is bonded to the wall of the receptacle with any suitable adhesive. This permits any size diameter wire 119—119 (FIG. 1) to be securely held in any of the slots 53—53.

Normally the wires 119—119 are placed in the slots 53—53 and the receptacle 19 in the reverse direction of which they are to be removed. However, this is not necessary and the wires 119—119 may be placed in the slots 53—53 in any random fashion. In both instances, the only requirement is that when the receptacle 19 is aligned with plate 18 by way of aligning pin 71 and shaft 14, the binary number of the grooves 61–68 correspond to a particular slot holding a particular wire. The necessity of this requirement will become apparent in the following discussion.

Shown in FIG. 1 is a computer 123, such as Model 810 B manufactured by Systems Engineering Laboratories, which is programmed with the wiring plan for a particular rack (not shown) in any convenient manner such as by punched tape. The wiring plan is divided into two portions. One portion is termed the instructive portion and the other tha directive portion. The instructive portion indicates in what sequence paired terminals of a rack are to be wired, and which wire of the group of wires 119—119 in the receptacle 19 is to be used. The directive portion of the wiring plan contains a series of binary numbers. Each binary number of the series of binary numbers in the directive portion corresponds to a binary number of the series of binary numbers formed by the grooves 61–68 on the bottom of the plate 18. As was previously discussed, each binary number formed by the grooves 61–68 corresponds to one of the slots 53—53 of the receptacle 19 and the wire held therein. The binary numbers in the directive portion are arranged in a predetermined order which directly corresponds to the wire sequence called for in the instructive portion of the wiring plan.

At the start of the wiring operation, button 121 mounted on the base 12 is depressed to simultaneously actuate the computer 123 and the Data Register and Control Unit 51. The computer 123 extracts the first wiring step, i.e., which terminals of the rack (not shown) are to be connected by a particular wire, for the instructive portion of the wiring plan and sends it in the form of a numerical signal to a video character generator 124 such as Model CC301 manufactured by Computer Communications Corp., by way of cable 126. Upon receiving the numerical signal, the video character generator 124 is cleared which in turn clears the T.V. screen of T.V. set 127 which is connected to the video character generator by way of cable 128. The numerical signal received is then converted to a video signal which is forwarded along cable 128 to the T.V. set 127. The T.V. set 127, which is advantageously supported by a post 129 mounted on the base 12, displays the wiring step from the instructive portion of the wiring plan on the T.V. screen. The computer 123 thereafter extracts the directive portion from the wire plan and sends it to a memory section of the Data Register and Control Unit 51 along cable 131 (see FIG. 3). Although the discussion of the computer 123 was limited to one wiring station, it is within the spirit of this invention to program the computer 123 with several wiring plans for different wiring stations.

Referring now to FIGS. 1 and 3, as stated earlier, the initial depressing of the switch 121, in addition to actuating the computer 123, also actuates the Data Register and Control Unit 51. At this time, the memory section and the comparison section are cleared and thereafter the memory section receives the direction portion of the wiring plan from the computer 123 and forwards the first binary number of the directive portion to the comparison section. Simultaneously with the comparison section receiving the first binary number from the memory section, the binary number formed by the position of the wheel mounted arms 91–98 of the microswitches 81–88, respectively, is registered in the comparison section. A comparison is then made between the binary number formed by the microswitches 81–88 and that of the memory section. If there is no difference, the wire called for by the wiring step on the T.V. screen is in a preselected position as designated by pointer 133 for removal by an operator from the receptacle 19. As can be appreciated, the pointer 133 can be set at any position about the path of the receptacle 19, but for convenience, it should be so positioned that the operator can view the T.V. screen while having access to the wire called for in the wiring step. If a difference is detected, an electrical pulse is forwarded to a control section of the Data Register and Control Unit 51. The control section, in turn, sends an electrical pulse along cable 52, which opens the solenoid 49 allowing pressurized air into the four-way valve 37. The air cylinder assembly 27 and rachet assembly 26 now operate to rotate the rachet gear wheel 21 in a clockwise direction, which, in turn, rotates the gear wheel 16, the plate 18, and receptacle 19 in a counterclockwise direction as viewed in FIG. 1. In this manner, a new slot and wire held therein is moved into the preselected position 133. After the plate 18 has rotated a predetermined distance, e.g., if the receptacle 19 has 180 slots 53—53, a 2° rotation of the plate 18 and the receptacle 19 moves a new binary number and a new slot into the preselected position 133, the electrical pulse from the control section ceases allowing the solenoid 49 to close under the action of the biased spring therein. The rotation of the plate 18 presents a different combination of grooves 61–68 to the wheeled arms 91–98 of the microswitches 81–88, respectively. The new position of the wheeled arms 91–98 of the microswitches 81–88, respectively, sends a different combination of electric currents along wires 111–118 to the comparison section of the Data Register and Control Unit 51, where a new binary number is registered.

Once again a comparison is made. If a difference between the binary number of the microswitches 81–88 and that of the memory section still exists, the steps are repeated. If there is no difference, the wire called for in the wiring step displayed on the T.V. screen is in the preselected position 133. The operator pulls the wire from the slot and wires the terminals according to the wiring step shown on the T.V. screen. When the terminals are wired, the operator once again pushes the button 121. The second and subsequent depressions, i.e., until the receptacle 19 is empty, of the button 121 simultaneously actuates the computer 123 and the comparison section of the Data Register and Control Unit 51. The computer 123 extracts the next wiring step from the instructive portion of the wiring plan and sends it in the form of a numerical signal to the video character generator 124. The video character generator 124, upon receiving the numerical signal, is cleared which, in turn, clears the T.V. screen. The numerical signal received is then converted to a video signal which is forwarded by way of cable 128 to the T.V. set 127 where the wiring step is displayed. As stated, the second and subsequent depressing of the switch 121, in addition to actuating the computer 123, also actuates the comparison section of the Data Register and Control Unit 51. The comparison section is cleared and receives the next binary number from the memory section and registers the binary number formed by wheel mounted arms 91–98 of the microswitches 81–88, respectively. The cycle is then repeated for moving the wire called for in the wiring step displayed on the T.V. screen into the preselected position 133.

OPERATION

When a particular digital rack is selected to be wired, an empty receptacle 19 as shown in FIGS. 1 or 4 having 180 slots 53—53 formed along the wall is positioned in a preloading station (not shown). The operator receives a loading wiring plan calling for particularly coded wires of varying length to be positioned in the slots 53—53 of the receptacle 19. The loading wire plan indicates which precut wire goes into which one of the 180 slots. Each slot corresponds to one of the 180 binary numbers formed by varying arcuate grooves 61–68 on the bottom of plate 18 (see FIG. 2). Normally, the loading wire plan calls for inserting the wires in the reverse order to which the wires are to be removed. However, it can be appreciated that the wires can be put into the receptacle 19 in any sequence as long as the wire occupies the particular slot called for in the loading wire plan which corresponds to one of the binary numbers.

After the receptacle 19 is loaded, it is either stored or moved to a wiring station 11. Referring now to FIGS. 1 and 3, at the wiring station 11, the plate 18 is positioned on a gear wheel 16 such that the shaft 14 and aligning pin 72 are inserted into the center hole 69 and aligning hole 71, respectively, of the plate 18. The wire loaded receptacle 19 is now aligned atop the plate 18 by inserting the shaft 14 and the aligning pin 71 into the center hole 76 and aligning hole 74, respectively, of the receptacle 19. In this manner, each of the slots 53—53 of the receptacle 19 is associated with a predetermined binary number.

A computer 123 is loaded with a tape (not shown) having a wiring plan which has an instructive portion and a directive portion. When the operator is ready to begin the initial wiring step, button 121 is depressed to simultaneously actuate the computer 123 and a Data Register and Control Unit 51. The computer extracts the first wiring step, i.e., which terminals of the rack (not shown) are to be connected by a particular wire, from the instructive portion of the wiring plan and sends it in the form of a numerical signal to a video character generator 124 by way of cable 126. The video character generator 124 upon receiving the numerical signal is cleared which, in turn, clears the T.V. screen of T.V. set 127. Thereafter, the video character generator 124 connects the numerical signal received to a video signal and forwards the video signal by way of cable 128 to the T.V. set 127 where the initial wiring step appears on the T.V. screen. The computer 123, thereafter, extracts the directive portion from the wiring plan and forwards it to a memory section of the Data Register and Control Unit 51, by way of cable 131.

As stated previously, the depressing of the switch 121 in addition to actuating the computer 123, also actuates the Data Register and Control Unit 51. At this time, the memory section and the comparison section are cleared and thereafter the memory section receives the directive portion of the wiring plan from the computer 123 and forwards the first binary number of the directive portion to the comparison section. Simultaneously with the comparison section receiving the first binary number from the memory section, the binary number formed by the position of wheel mounted arms 91–98 of microswitches 81–88, respectively, is registered in the comparison section. The comparison section compares the binary number received from the memory section with the binary number registered by the microswitches 81–88. If the binary numbers are the same, indicating that the wire called for by the instructive portion of the wiring plan displayed on the T.V. screen is in a designated preselected wire removal position, as indicated by pointer 133, the control section of the Data Register and Control Unit 51 takes no action. The operator takes the wire from the slot in the preselected wire removal position and wires the terminals of the rack (not shown) according to the wiring step on the T.V. screen.

If the comparison section finds a difference between the binary number from the memory section and the binary number registered by the microswitches 81–88, the control section of the Data Register and Control Unit 51 is activated. An electric pulse from the control section is sent along a cable 52 to open a spring biased solenoid 49.

With the solenoid 49 in the open position, pressurized air from a pressurized air supply (not shown) passes into a four-way valve 37 by way of conduit 48. Air cylinder 38 now operates to actuate rachet assembly 26 to rotate rachet gear wheel 21 in a clockwise direction as viewed in FIG. 1. Rotation of the rachet gear wheel 21 in a clockwise direction rotates gear wheel 16, plate 18, and receptacle 19 in a counterclockwise direction as viewed in FIG. 1. After a 2° rotation of the plate 18, the electric pulse from the control section ceases allowing the solenoid 49 to close under the biased spring therein. The rotation of the plate 18 presented a different combination of grooves 61–68 to the wheeled arms 91–98 of the microswitches 81–88, respectively, which sets the microswitches in either the "on" or "off" position. This new "on-off" combination is forwarded by way of wires 111–118 to set a new binary number in the comparison section of the Data Register and Control Unit 51.

A comparison is made once again by the comparison section of the Data Register and Control Unit 51 between the previous received binary number from the memory section and the new binary number generated by the rotation of the plate 18. If the binary numbers match, the control section takes no action. If the binary numbers do not match, the control section once again sends an electrical pulse to the solenoid 49 to repeat the cycle to once again rotate the receptacle 19 and plate 18 2°. The sequence is repeated until the stored binary number in the comparison section of the Data Register and Control Unit 51 match the binary number formed by the microswitches 81–88.

When the binary numbers match, there is no further rotation of the receptacle 19 and the operator pulls the wire from the slot in the preselected wire removal position and wires the rack according to the instructions shown on the T.V. screen. When the wiring of the terminals is completed, the operator once again pushes button 121. The second and subsequent depressions, i.e., until the receptacle 19 is empty, of the button 121 simultaneously actuates the computer 123 and the comparison section of the Data Register and Control Unit 51.

The computer 123 extracts the next wiring step from the instructive portion of the wiring plan and sends it in the form of a numerical signal to the video character generator 124. The video character generator 124, upon receiving the numerical signal, is cleared which, in turn, clears the T.V. screen. The numerical signal received is then converted to a video signal which is forwarded by way of cable 128 to the T.V. set 127 where the wiring step is displayed. As stated, the second and subsequent depressing of the switch 121, in addition to actuating the computer 123, also actuates the comparison section of the Data Register and Control Unit 51. The comparison section is cleared and receives the next binary number from the memory section and registers the binary number formed by the position of the wheel mounted arms 91–98 of the microswitches 81–88, respectively. The cycle is then repeated for moving the wire called for in the wiring step displayed on the T.V. screen into the preselected position 133.

It can be seen that using the above-described apparatus does not require a high level of operator attention. The wires are presented to the operator in the sequence in which they are to be used thereby eliminating the error of wiring terminals out of turn. Further, it eliminates the error of using the wrong wire to connect the terminals because the proper wire is automatically presented to the operator at the preselected wire removal position.

What is claimed is:

1. An apparatus for positioning an article selected from a plurality of articles at a preselected position, comprising:

means rotatably mounted for holding the plurality of articles separate from one another at predetermined locations on said holding means;

means for rotating said holding means to sequentially advance each of said locations to the preselected position;

means for determining when a predetermined location is in the preselected position; and means responsive to said determining means for operating said rotating means only when the predetermined location is in a position other than the preselected position so as to move the predetermined location into the preselected position.

2. An apparatus for sequentially positioning a plurality of articles at a preselected position in a predetermined order, comprising:

a rotatably mounted receptacle;

means for retaining each of the articles at a predetermined location on said receptacle;

means for rotating said receptacle to sequentially advance each of said locations into the preselected position;

means for sensing when a predetermined location is moved into the preselected position;

means for controlling said sensing means to sequentially select the predetermined locations in the predetermined order; and means responsive to said sensing means for energizing said rotating means when a location other than the predetermined location is rotated into the preselected position.

3. The apparatus as claimed in claim 2 wherein the sensing means includes:

a series of arcuate grooves of varying lengths arranged on the bottom of said receptacle to form a series of binary numbers, wherein each binary number is associated with a location on said receptacle; and a series of switches each of which corresponds to one of said series of arcuate grooves for sequentially reading said series of binary numbers as each of said locations is moved into the preselected position.

4. The apparatus as claimed in claim 2 wherein:

said sensing means is actuated when said receptacle location is at the preselected position to generate a signal which is characteristic of the receptacle location at the preselected position;

said controlling means sequentially generates a series of signals in a predetermined order, each signal corresponding to the signal generated by said sensing means for a given receptacle location; and said energizing means receives and compares the signal from said controlling means sequentially with the signal from said sensing means and energizes said rotating means when a difference exists between the signals to rotate said receptacle until a selected receptacle location is at the preselected position, said controlling means generating the next signal in the predetermined order after the previously selected receptacle location is at the preselected position.

5. An apparatus for positioning a wire selected from a plurality of wires at a preselected wire removal position, comprising:

a rotatably mounted receptacle;

means for retaining at least one end of each of the wires at a predetermined location on said receptacle;

means for rotating said receptacle to position each location at the preselected wire removal position;

means operated on by the rotation of said holding means for sensing when a predetermined location is in the preselected wire removal position; and means responsive to said sensing means for operating said rotating means only when a predetermined location is in a position other than the preselected position so as to rotate the predetermined location into the wire removal position.

6. An apparatus for advancing a wire selected from a plurality of wires to a preselected wire removal position, comprising:

a rotatably mounted member;

a receptacle for receiving the plurality of wires, said receptacle being mounted for rotation with said rotatable member;

means associated with said receptacle for holding each wire at a predetermined location about said receptacle;

means associated with said rotatable member for identifying each receptacle location;

means for rotating said rotatable member to sequentially displace each receptacle location to the preselected wire removal position;

means responsive to said identifying means for generating a signal characteristic of each receptacle location, said signal generating means being actuated when each receptacle location is at the preselected wire removal position; and means responsive to said signal generating means for operating said rotating means when a desired receptacle location is in a position other than the preselected wire removal position so as to move the predetermined location into the preselected wire removal position to permit removal of a desired wire therefrom.

7. The apparatus as set forth in claim 6, wherein the holding means is a strip having slots formed therein and mounted on the wall of said receptacle.

8. The apparatus as set forth in claim 6 wherein the reference means is a series of arcuate grooves of various lengths.

9. The apparatus as set forth in claim 8, wherein the means responsive to said reference means are microswitches, each of which corresponds to one of the series of arcuate grooves and having an arm supporting a roller wherein the roller moves in and out of their respective groove as the rotatably mounted member rotates.

10. The apparatus of claim 6 for sequentially positioning a plurality of articles at the preselected wire removal position in a predetermined order, wherein said operating means comprises:

means for storing and sequentially forwarding a series of signals in a predetermined order, each signal corresponding to the signal generated by said signal generating means for a given receptacle location;

means for receiving a signal from said storing and forwarding means and for sequentially comparing the signal with signals from said signal generating means; and means responsive to said receiving and comparing means when a difference exists between the signal from said storing and forwarding means and a signal from said responsive means for energizing said rotating means to sequentially displace each receptacle location to the preselected wire removal position until the predetermined receptacle location is moved into the preselected wire removal position, said storing and forwarding means forwarding the next signal in the predetermined order after the previously selected receptacle location is at the preselected position.

* * * * *